United States Patent
Lee et al.

(10) Patent No.: US 9,626,962 B2
(45) Date of Patent: Apr. 18, 2017

(54) METHOD AND APPARATUS FOR RECOGNIZING SPEECH, AND METHOD AND APPARATUS FOR GENERATING NOISE-SPEECH RECOGNITION MODEL

(71) Applicant: Samsung Electronics Co., Ltd., Suwon-si (KR)

(72) Inventors: Ho Sub Lee, Seoul (KR); Young Wan Seo, Yongin-si (KR); Young Sang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 14/621,050

(22) Filed: Feb. 12, 2015

(65) Prior Publication Data

US 2015/0317998 A1  Nov. 5, 2015

(30) Foreign Application Priority Data

May 2, 2014 (KR) .................. 10-2014-0053592

(51) Int. Cl.
*G10L 15/20* (2006.01)
*G10L 21/0208* (2013.01)
*G10L 15/22* (2006.01)
*G10L 15/30* (2013.01)

(52) U.S. Cl.
CPC .......... *G10L 15/20* (2013.01); *G10L 21/0208* (2013.01); *G10L 15/30* (2013.01); *G10L 2015/228* (2013.01)

(58) Field of Classification Search
CPC ..... G10L 15/20; G10L 21/0208; G10L 15/06; G10L 15/22; G10L 15/30; G10L 15/32
USPC .................. 704/233, 231, 235, 244, 251
See application file for complete search history.

(56) References Cited

U.S. PATENT DOCUMENTS

| | | | |
|---|---|---|---|
| 7,224,981 B2 | 5/2007 | Deisher et al. | |
| 7,302,393 B2 | 11/2007 | Fischer et al. | |
| 8,234,111 B2 * | 7/2012 | Lloyd | G10L 15/20 |
| | | | 704/231 |
| 2004/0138882 A1 | 7/2004 | Miyazawa | |

FOREIGN PATENT DOCUMENTS

| | | |
|---|---|---|
| JP | 2004-206063 A | 7/2004 |
| KR | 10-0285502 B1 | 4/2001 |
| KR | 10-2005-0021392 A | 3/2005 |
| KR | 10-2005-0007429 A | 1/2006 |
| KR | 10-0800367 B1 | 2/2008 |
| KR | 10-2009-0025939 A | 3/2009 |
| KR | 10-2010-0101986 A | 9/2010 |

* cited by examiner

*Primary Examiner* — Charlotte M Baker
(74) *Attorney, Agent, or Firm* — NSIP Law

(57) ABSTRACT

An apparatus and method for recognizing a speech, and an apparatus and method for generating a noise-speech recognition model are provided. The speech recognition apparatus includes a location determiner configured to determine a location of the apparatus, a noise model generator configured to generate a noise model corresponding to the location by collecting noise data related to the location, and a noise model transmitter configured to transmit the noise model to a server.

22 Claims, 11 Drawing Sheets

METHOD AND APPARATUS FOR RECOGNIZING SPEECH, AND METHOD AND APPARATUS FOR GENERATING NOISE-SPEECH RECOGNITION MODEL

CROSS-REFERENCE TO RELATED APPLICATION(S)

This application claims the benefit under 35 U.S.C. §119(a) of Korean Patent Application No. 10-2014-0053592 filed on May 2, 2014, in the Korean Intellectual Property Office, the entire disclosure of which is incorporated herein by reference for all purposes.

BACKGROUND

1. Field

The following description relates to a speech recognition technique, a method and apparatus for recognizing speech, and a method and apparatus for generating noise-speech recognition model.

2. Description of Related Art

Speech recognition has emerged as a core technology for future smart phones and intelligent software. However, there are a lot of technical obstacles that need to be addressed for a wide use of speech recognition in industries. A primary objective is to reduce the effects of interfering signals added to a speech, or to reduce effects of undesirable noises. Herein, a noise refers to all kinds of signals that may be added to a speech to be recognized. For example, a noise may include background noise from surroundings, communication line distortion, acoustic echo, background music, and voice from other people. A speech targeted for recognition may include these noises, thereby resulting in a degraded performance of a speech recognition apparatus.

In order to solve this drawback, techniques such as speech enhancement, feature compensation, model adaptation and the like have been developed; however, still users do not experience drastic improvement in the performance of speech recognition technologies.

Speech enhancement and feature compensation are techniques that infer or restore a clear speech signal from speech mixed with noise by using a signal processing technique and a data analyzing technique. In addition, model adaptation is a technique that takes into consideration speech mixed with noise at the beginning when constructing a speech recognition system.

It is widely viewed that model adaption yields more improved performance of speech recognition than speech enhancement and feature compensation. However, it is not possible to collect every noise and every speech mixed with noise in the word and to remove such noise; thus, model adaption has been used only in a specific domain such as speech recognition for automatic response system (ARS), for example.

SUMMARY

In one general aspect, there is provided a speech recognition apparatus including a location determiner configured to determine a location of the apparatus, a noise model generator configured to generate a noise model corresponding to the location by collecting noise data related to the location, and a noise model transmitter configured to transmit the noise model to a server.

The noise model generator may be configured to collect the noise data that is generated at the location via a microphone of the apparatus.

The noise model generator may be configured to collect the noise data from web videos related to the location.

The general aspect of the speech recognition apparatus may further include a speech recognizer configured to perform speech recognition using a noise-speech recognition model that is generated by the server by applying the noise model to a baseline speech recognition model.

The speech recognizer may be configured to receive from the server the noise-speech recognition model applied with the noise model corresponding to the location, and to perform speech recognition using the noise-speech recognition model.

The speech recognizer may be further configured to transmit a speech recognition request including the location and a speech signal to the server, and receive a result of speech recognition that is performed on the speech signal using the noise-speech recognition model.

In another general aspect, there is provided an apparatus for generating a noise-speech recognition model, the apparatus including a noise model receiver configured to receive, from a mobile terminal, a noise model corresponding to a location of the mobile terminal; a noise-speech recognition model generator configured to generate a noise-speech recognition model corresponding to the location, by applying the noise model to a baseline speech recognition model; and a memory storage configured to store the noise-speech recognition model.

The noise model may include noise data related to the location of the mobile terminal and information on the location of the mobile terminal.

The general aspect of the apparatus may further include a noise-speech recognition model transmitter configured to, in response to receiving a noise-speech recognition model transmission request including the location of the mobile terminal, transmit a noise-speech recognition model corresponding to the location to the mobile terminal.

The general aspect of the apparatus may further include a speech recognizer configured to, in response to receiving a speech recognition request including information on the location of the mobile terminal and speech signal from the mobile terminal, perform speech recognition on the speech signal using the noise-speech recognition model corresponding to the location; and a speech recognition result transmitter configured to transmit a result of the speech recognition to the mobile terminal.

In another general aspect, there is provided a method of speech recognition, the method including determining a location of a mobile terminal, collecting noise data related to the location, generating noise model corresponding to the location using the noise data, and transmitting the noise model to a server.

The collecting of noise data may include collecting noise data generated at the location.

The collecting of noise data may include collecting noise data from a web video that is found by searching web videos related to the location.

The general aspect of the method may further include receiving a speech signal, and performing speech recognition on the speech signal using the noise-speech recognition model that is generated by the server by applying the noise model to a baseline speech recognition model.

The performing of speech recognition may include determining a location of the mobile terminal at time of receiving the speech signal, and receiving a noise-speech recognition model to which the noise model corresponding to the location of the mobile terminal using the received noise-speech recognition model.

The performing of speech recognition may involve transmitting a speech recognition request including the location of the mobile terminal and the speech signal to the server, and receiving a result of speech recognition performed on the speech signal using the noise-speech recognition model to which the noise model corresponding to the location of the mobile terminal at time of receipt of the speech signal is applied.

In another general aspect, there is provided a method of generating a noise-speech model, the method involving receiving a noise model corresponding to a location, generating a noise-speech recognition model corresponding to the location by applying the noise model to a baseline speech recognition model, and storing the noise-speech recognition model.

The noise model may include noise data related to the location and information on the location.

The general aspect of the method may further include receiving, from the mobile terminal, a noise-speech recognition model transmission request including the information on the location of the mobile terminal, and transmitting, to the mobile terminal, a noise-speech recognition model corresponding to the location of the mobile terminal.

The general aspect of the method may further include receiving, from a mobile terminal, a speech recognition request including the information on the location of the mobile terminal and a speech signal; performing speech recognition on the speech signal using a noise-speech recognition model corresponding to the location of the mobile terminal; and transmitting a result of the speech recognition to the mobile terminal.

In another general aspect, there is provided an apparatus including a microphone configured to detect a speech signal, and a processor configured to obtain a noise-speech recognition model corresponding to a location of the apparatus and to recognize a word in the speech signal using the noise-speech recognition model.

The processor may be configured to determine the location of the apparatus and generate a noise model.

The general aspect of the apparatus may further include a noise model transmitter configured to transmit the noise model to a server, and the processor may be configured to obtain the noise-speech recognition model from the server.

The processor may be configured to collect noise data at the location from a sound signal detected by the microphone.

Other features and aspects may be apparent from the following detailed description, the drawings, and the claims.

Figure 1:
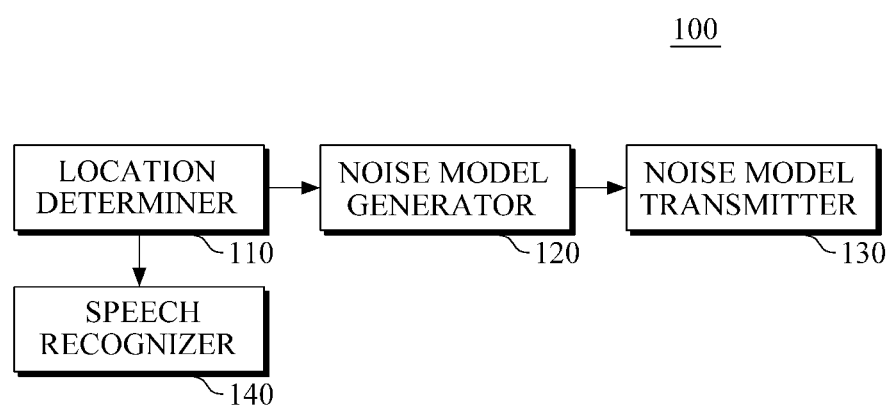
FIG. 1 is a diagram illustrating an example of an apparatus for recognizing a speech.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of an apparatus for recognizing a speech.

An apparatus 100 for recognizing a speech may be included in a mobile terminal that may be carried by a user and has the capability of communicating with a server using wireless communication. For example, the mobile terminal may include a smart phone, a cellular phone, a Personal Digital Assistant (PDA), a laptop computer, a phablet, a tablet PC, an MP3 player, and a navigation device. In addition, the server may provide a cloud computing service over the Internet.

Examples of wireless communication techniques that may be used to communicate with the mobile terminal include short-range wireless communication techniques, wireless communication techniques and satellite communication techniques, wherein the short range wireless communication techniques comprise Bluetooth, Radio Frequency Identification (RFID), Ultra Wideband (UWB), and Zigbee, while the wireless communication techniques include Wibro, Wimax, WCDMA, High Speed Downlink Packet Access (HSDPA), Long Term Evolution (LTE), and Long Term Evolution Advanced (LTE-A).

Referring to the example illustrated in FIG. 1, the apparatus 100 includes a location determiner 110, a noise model generator 120, a noise model transmitter 130, and a speech recognizer 140. The location determiner 110, the noise model generator 120, and the speech recognizer 140 may be implemented with one or more computer processor.

The location determiner 110 may determine a location of a mobile terminal. The mobile terminal may include a microphone.

According to one example, the location determiner 110 may determine the current location of a mobile terminal using various location determination technologies. For example, in the event that a mobile terminal includes a Global Positioning System (GPS) sensor, the location determiner 110 may activate the GPS sensor and obtain GPS coordinates of the current location of the mobile terminal. The location determiner 110 may convert the GPS coordinates into an address, and determine a place corresponding to the address as the current location of the mobile terminal.

In another example, the location determiner 110 may determine the current location of a mobile terminal using a location determination technology that is based on Cell ID, Time of Arrive (TOA), Time Difference of Arrival (TDoA), Received Signal Strength Indicator (RSSI), Angle of Arrival (AOA), or Fingerprint.

In another example, the location determiner 110 may determine the current location of a mobile terminal using information that is input by a user of the mobile terminal. For example, the location determiner 110 may query the user about the current location, and determine a location that is input by the user in response to the query as the current location of the mobile terminal.

In another example, in the event that a user of a mobile terminal inputs the current location using an application providing Location-Based Service (LBS), the location determiner 110 may determine the current location of the user as the current location of a mobile terminal.

The noise model generator 120 may collect noise data related to the mobile terminal's current location determined by the location determiner 110, and generate a noise model corresponding to the current location of the mobile terminal using the received noise data.

According to one example, the noise model generator 120 may activate a microphone included in a mobile terminal, and collect noise data generated at the current location through the activated microphone.

According to another example, using the current location of the mobile terminal as a keyword, the noise model generator 120 may search for videos related to the current location of the mobile terminal on the web. Then, the noise model generator 120 may extract sound from the found video and collect noise data from the extracted sound.

The noise model generator 120 may divide the received noise data according to a predetermined time interval (e.g., one minute) and generate a noise model corresponding to the current location of the mobile terminal by adding information on the current location of the mobile terminal to the divided noise data.

For example, the noise model generator 120 may generate a noise model corresponding to the current location of the mobile terminal, by labeling the collected noise data with the current location of the mobile terminal.

In another example, the noise model generator 120 may generate a noise model corresponding to the current location of the mobile terminal, by adding information on the current location of the mobile terminal to the received noise data as metadata.

Meanwhile, according to one example, a noise model may further include additional information, such as time of receipt of noise data and identification information of a mobile terminal. For example, the noise model generator 120 may label the additional information as well as information on the current location of the mobile terminal to the collected noise data. For example, a noise model may be labeled as "20130920190543_Yankee Stadium_device A_1.wav." In this example, "20130920190543" indicates the time when noise data was collected; "Yankee Stadium" indicates a location in which the noise data was collected; "device A" indicates identification information of a mobile terminal; and "1" indicates a division order of the noise data.

In another example, the noise model generator 120 may generate a noise model corresponding to the current location of the mobile terminal, by adding meta data to the received noise data, wherein the meta data includes both information on the current location of the mobile terminal and additional information.

Meanwhile, the noise model transmitter 130 may transmit the noise model, generated by the noise model generator 120, to a server. For example, the server may provide a cloud computing service to a mobile terminal over the Internet.

The speech recognizer 140 may perform speech recognition on a speech signal using various speech recognition algorithms. The speech recognition algorithm may include various speech recognition algorithms, for example, a Neural Network algorithm and Hidden Markov Model (HMM).

The speech signal may be received from a user through a microphone of a mobile terminal. For example, in response to receiving a speech recognition request from a user of a mobile terminal, the speech recognizer 140 may activate the microphone to receive the speech signal from the user. The speech signal received through the microphone may be the user's speech mixed with surrounding noise. Thus, if noise related to the current location is taken into consideration when performing speech recognition on the speech signal, performance of the speech recognition may improve.

According to one example, in response to receipt of a speech signal, the speech recognizer 140 may request a server to transmit a noise-speech recognition model corresponding to the current location of a mobile terminal when the speech signal is received Meanwhile, a noise-speech recognition model corresponding to the current location of a mobile terminal indicates a noise-speech recognition model to which a noise model corresponding to the current location of the mobile terminal is applied.

The speech recognizer 140 may perform learning on a speech recognition algorithm using the received noise-speech recognition model, and may perform speech recognition by applying a speech signal to the learned speech recognition algorithm.

According to another example, at the time a speech signal is received, the speech recognizer 140 may request the server to perform speech recognition by transmitting the current location of the mobile terminal and the received speech signal to the server, and receive a result of the speech recognition. The result of the speech recognition may be a result of speech recognition that is performed by applying a speech signal to a speech recognition algorithm that is learned using a noise-speech recognition model corresponding to the current location of the mobile terminal, wherein the current location of the mobile terminal is included in a speech recognition request. Meanwhile, the speech recognition algorithm may include various speech recognition algorithms, for example, a Neural Network algorithm and HMM.

Figure 2:
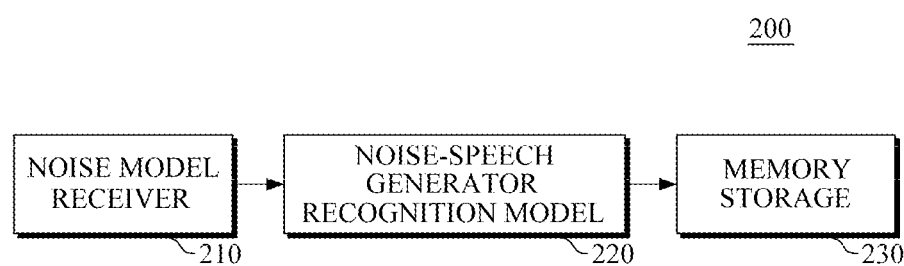
FIG. 2 is a diagram illustrating an example of an apparatus for generating a noise-speech recognition model.

FIG. 2 is a diagram illustrating an example of an apparatus for generating a noise-speech recognition model.

Referring to the example illustrated in FIG. 2, an apparatus 200 for recognizing a speech includes a noise model receiver 210, a noise-speech recognition model generator 220, and a memory storage 230.

The noise model receiver 210 may receive a noise model generated by at least one mobile terminal.

The noise-speech recognition model generator 220 may generate a noise-speech recognition model corresponding to location information included in the received noise model. For example, the noise-speech recognition model generator 220 may generate a noise-speech recognition model corresponding to location information included in a noise model by applying noise data included in the noise model to a baseline speech recognition model.

The baseline speech recognition model may be learning data composed of speech without noise and text corresponding to the speech. The speech may be on the basis of a phoneme, a word, or a sentence.

The noise-speech recognition model generator 220 may generate a noise-speech recognition model corresponding to a specific location by combining noise data included in a received noise model with speech included in a speech recognition model and adding location information included in the noise model thereto.

Figure 5:
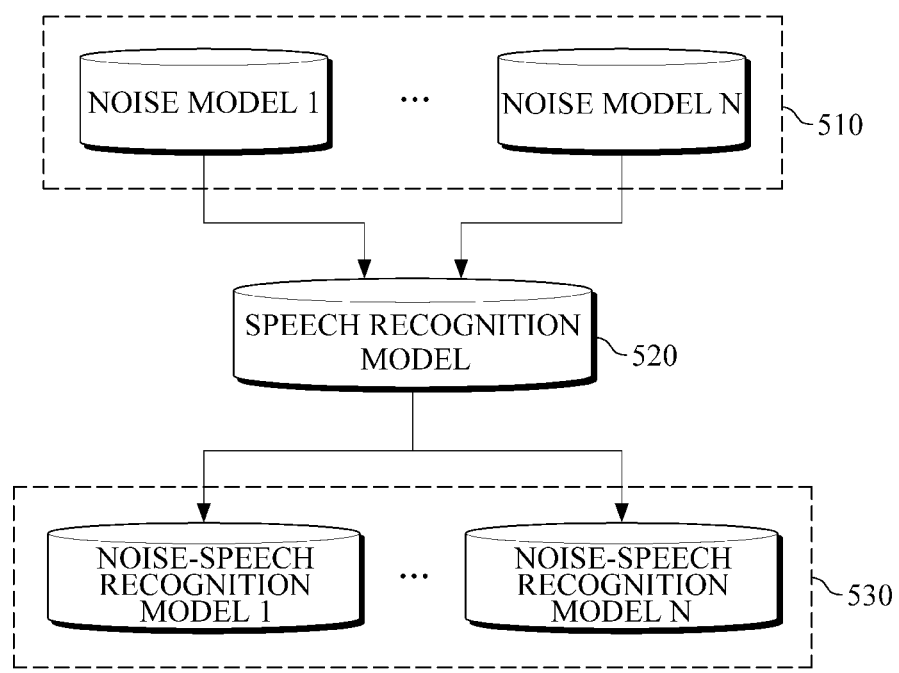
FIG. 5 is a diagram illustrating an example a method for generating a noise-speech recognition model.

Referring to the example illustrated in FIG. 5, the noise-recognition model generator 220 may generate N number of noise-speech recognition models 530 by applying N number of noise-models 510 to a baseline speech recognition model 520. At this point, the N number of noise models 510 may be generated by a plurality of mobile terminals in a manner in which each mobile terminal collects noise data related to a location thereof. In another example, the N number of noise models 510 may be generated by a single mobile terminal in a manner that the single mobile terminal collects noise data related to different locations.

The memory storage 230 may store a noise-speech recognition model generated by the noise-speech recognition model generator 220. The memory storage 230 may include various non-transitory storage mediums, such as flash memory, hard disk-type memory, multimedia card micro-type memory, card-type memory (e.g. SD memory and XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk and the like.

Meanwhile, according to one example, the memory storage 230 may distributedly store the noise-speech recognition model in various computing devices existing in a cloud computing environment. For example, a computing device may include a mobile terminal, a server, a desk-top computer, a set top box, a smart TV and the like.

Figure 3:
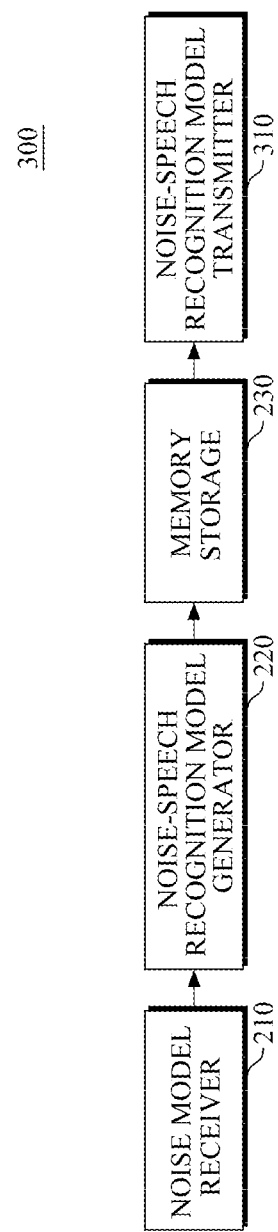
FIG. 3 is a diagram illustrating another example of an apparatus for generating a noise-speech recognition model.

FIG. 3 is a diagram illustrating another example of an apparatus for generating a noise-speech recognition model.

Referring to the example illustrated in FIG. 3, an apparatus 300 for generating a speech recognition model includes a noise model receiver 210, a noise-speech recognition model generator 220, a memory storage 230, and a noise-speech recognition model transmitter 310.

The noise model receiver 210, the noise-speech recognition model generator 220, and the memory storage 230, all of which are illustrated in FIG. 3, are identical to those illustrated in FIG. 2; thus, detailed descriptions thereof are omitted herein.

The noise-speech recognition model transmitter 310 may transmit a noise-speech recognition model stored in the memory storage 230 to a mobile terminal. For example, in the event that a noise-speech recognition model transmission request including the current location of a mobile terminal is received from the mobile terminal, the noise-speech recognition model transmitter 310 may search for all noise-recognition models corresponding to the current location of the mobile terminal out of all noise-speech recognition models stored in the memory storage 230. Then, the noise-speech recognition model transmitter 310 may transmit the found noise-speech recognition models to the mobile terminal that has requested transmission of a noise-speech recognition model.

Figure 4:
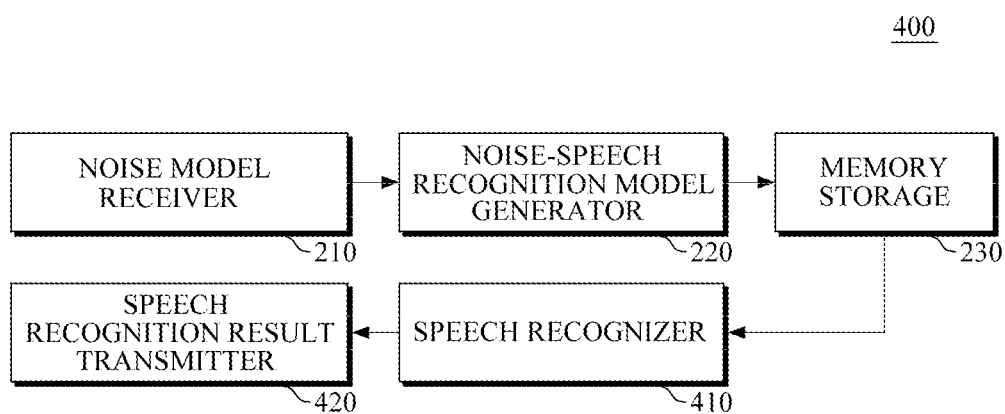
FIG. 4 is a diagram illustrating another example of an apparatus for generating a noise-speech recognition model.

FIG. 4 is a diagram illustrating another example of an apparatus for generating a noise-speech recognition model.

Referring to the example illustrated in FIG. 4, an apparatus 400 for generating a speech recognition model includes a noise model receiver 210, a noise-speech recognition model generator 220, a memory storage 230, a speech recognizer 410, and a speech recognition result transmitter 420.

The noise model receiver 210, the noise-speech recognition model generator 220, and the memory storage, illustrated in FIG. 4, are identical to those illustrated in FIG. 2; thus, detailed descriptions thereof are omitted herein.

When a speech recognition request including the current location of a mobile terminal and a speech signal is received from the mobile terminal, the voice recognizer 410 may perform speech recognition on the speech signal using a noise-speech recognition model stored in the memory storage 230.

For example, the speech recognizer 410 may perform learning on a speech recognition algorithm using a noise-speech recognition model that corresponds to the current location included in the speech recognition request out of all noise-speech recognition models stored in the memory storage. Then, the speech recognizer 410 may perform speech recognition by applying the speech signal to the learned speech recognition algorithm. Meanwhile, the speech recognition algorithm may be one of various speech recognition algorithms, such as, for example, a neural network algorithm and Hidden Markov Model (HMM).

The speech recognition result transmitter 420 may transmit a result of the speech recognition performed by the speech recognizer 410 to the mobile terminal that has requested the speech recognition.

Meanwhile, the apparatuses for generating a noise-speech recognition model, which are illustrated in FIGS. 2 and 4, may be included in a server that communicates with at least one mobile terminal. At this point, the server may provide a clouding computing service to at least one mobile terminal.

Figure 6:
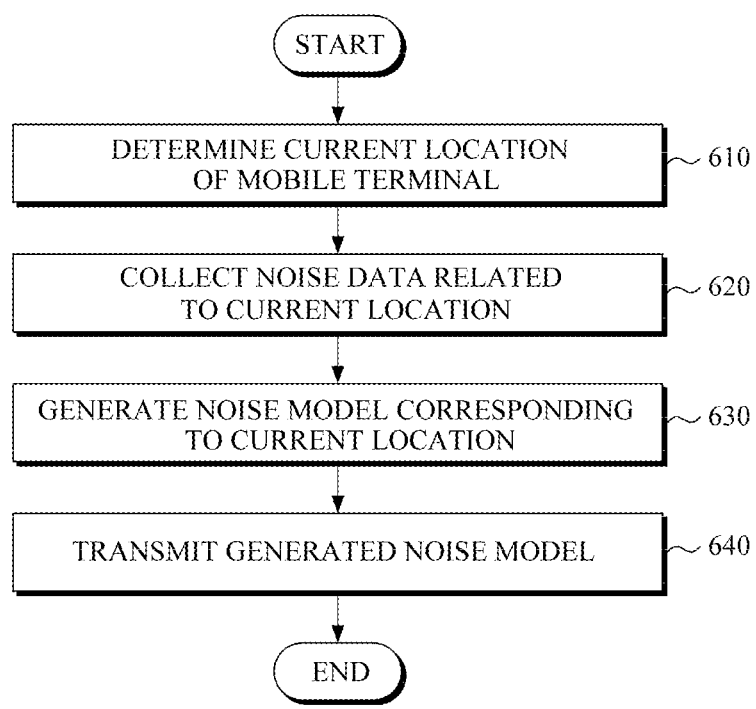
FIG. 6 is a flow chart illustrating an example of a method for generating a noise model.

FIG. 6 is a flow chart illustrating an example of a method for generating a noise model.

Each operation illustrated in FIG. 6 may be performed by a mobile terminal that includes the apparatus 100 illustrated in FIG. 1.

Referring to FIG. 6, a mobile terminal may determine the current location thereof in 610, and collect noise data related to the current location in 620.

According to one example, a mobile terminal may activate a microphone to collect noise data generated at the current location.

According to another example, a mobile terminal may search for a web video using the current location as a keyword to collect noise data from the found web video.

In 630, the mobile terminal may generate a noise model corresponding to the current location by adding information on the current location to the collected noise data.

For example, the mobile terminal may generate a noise model corresponding to the current location by dividing the collected noise data according to appropriate time units (e.g., one minute) and labeling the divided noise data with the current location.

In another example, the mobile terminal may generate a noise model corresponding to the current location by adding the current location in a form of meta data to the collected noise data.

In 640, the mobile terminal may transmit the generated noise model to the server.

Figure 7:
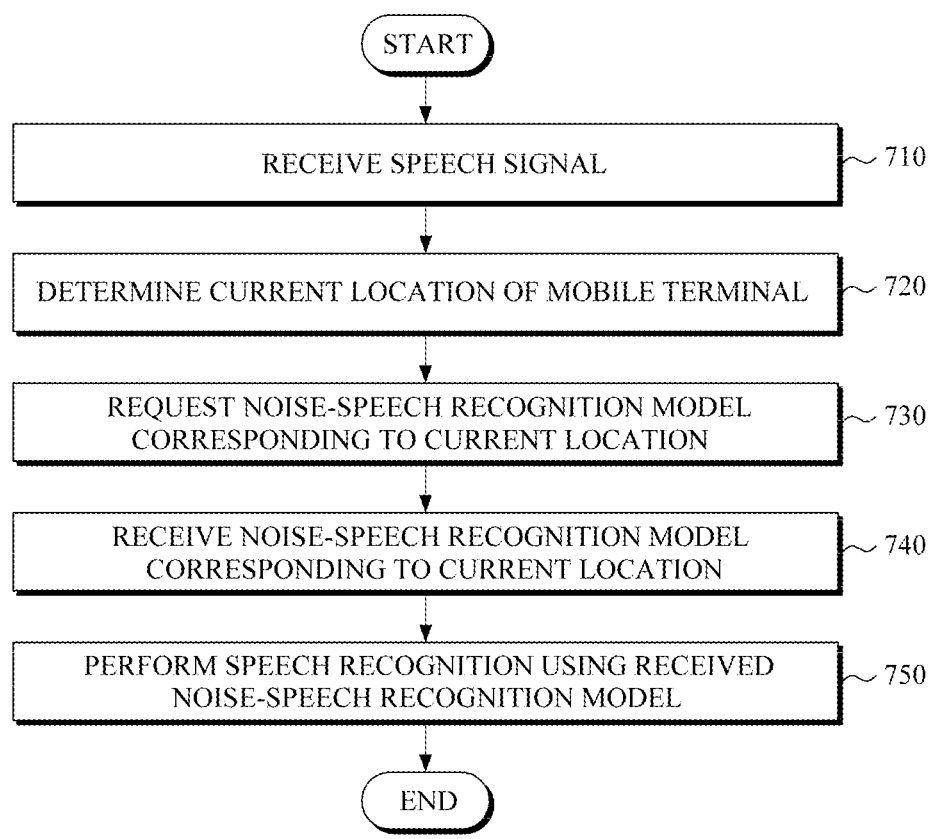
FIG. 7 is a flow chart illustrating an example of a method for recognizing a speech.

FIG. 7 is a flow chart illustrating an example of a method for recognizing a speech.

Each operation illustrated in FIG. 7 may be performed by a mobile terminal including the apparatus 100 illustrated in FIG. 1.

Referring to the example illustrated in FIG. 7, a mobile terminal receives a speech signal from a user in 710.

In 720, the mobile terminal determines the current location thereof at a time when receiving the speech signal.

In 730, the mobile terminal requests the server to transmit a noise-speech recognition model corresponding to the current location.

In 740, the mobile terminal receives the noise-speech recognition model corresponding to the current location from a server.

In 750, the mobile terminal may perform speech recognition on the speech signal using the received noise-speech recognition model. For example, the mobile terminal may perform speech recognition by learning a speech recognition algorithm using the noise-speech recognition model received from the server and applying the speech signal to the learned speech recognition algorithm. The speech recognition algorithm may include various speech recognition algorithms such as, for example, a Neural Network algorithm or HMM.

Figure 8:
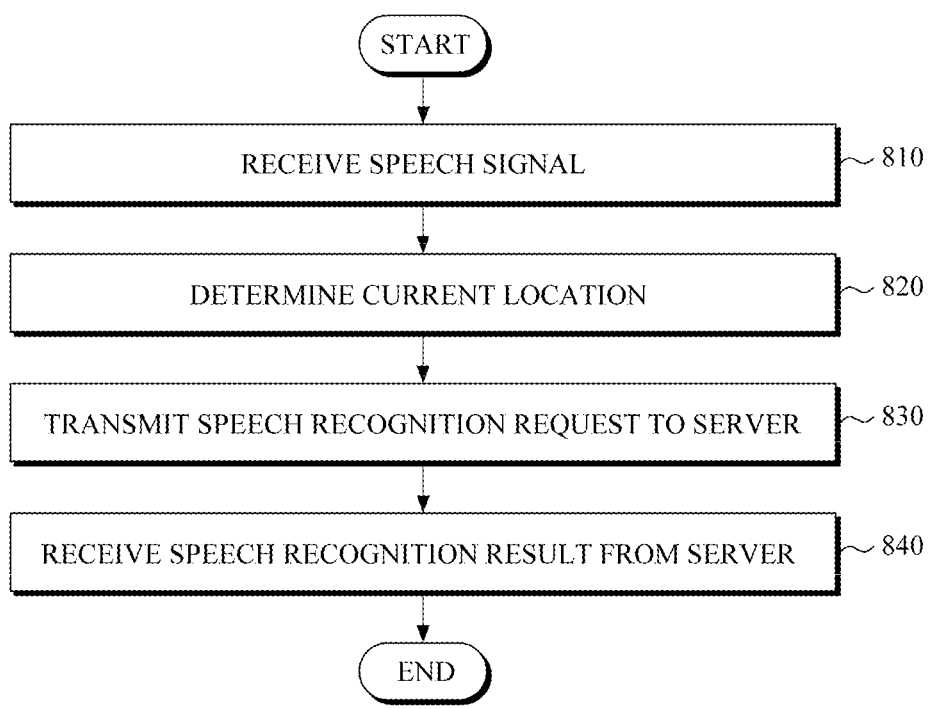
FIG. 8 is a flow chart illustrating another example of a method for recognizing a speech.

FIG. 8 is a flow chart illustrating an example of a method for recognizing a speech.

Each operation illustrated in FIG. 8 may be performed by a mobile terminal including the apparatus 100 illustrated in FIG. 1.

Referring to the example illustrated in FIG. 8, the apparatus 100 may receive a speech signal from a user in 810.

In 820, the apparatus 100 may determine the current location thereof at a time of receiving the speech signal.

In 830, the apparatus 100 may transmit a speech recognition request to a server. At this point, the speech recognition request may include the current location of the apparatus 100 and the received speech signal.

In 840, the apparatus 100 may receive a result of speech recognition of the speech signal from the server. In this example, the result of speech recognition may be a result of speech recognition performed by applying the speech signal to a speech recognition algorithm that is learned using a noise-speech recognition model corresponding to the current location of the apparatus 100. The speech recognition algorithm may include various speech recognition algorithms such as, for example, a Neural Network algorithm and HMM.

Figure 9:
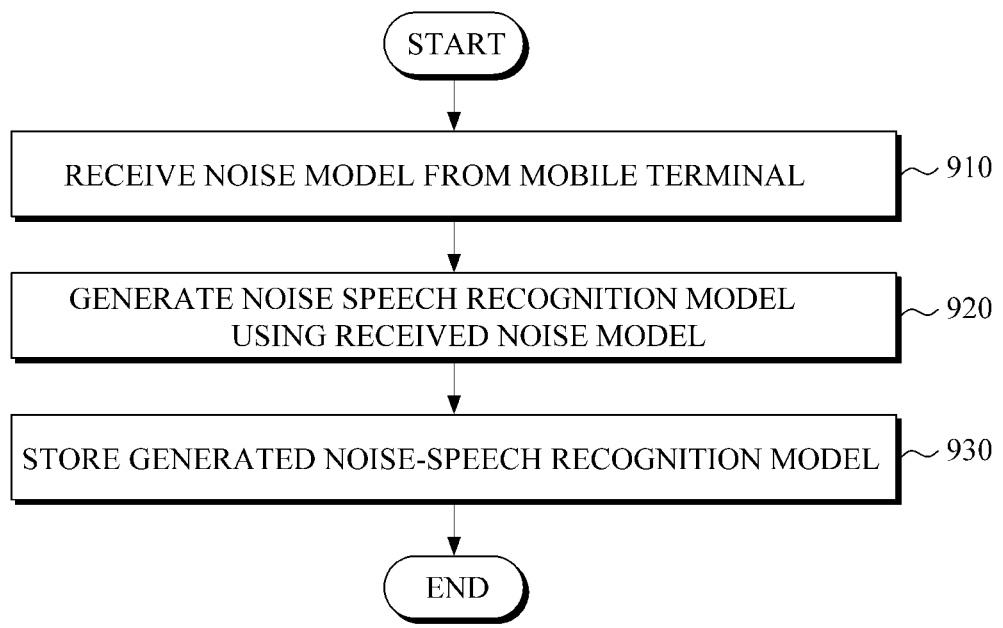
FIG. 9 is a flow chart illustrating an example of a method for generating a noise-speech recognition model.

FIG. 9 is a flow chart illustrating an example of a procedure for generating a noise-speech model.

Each operation illustrated in FIG. 9 may be performed by a server including the apparatus illustrated in FIG. 2.

Referring to the example illustrated in FIG. 9, a server may receive, from one or more mobile terminals, noise models corresponding to the current locations of one or more mobile terminals in 910.

In 920, the server may generate noise-speech recognition models corresponding to the current locations of one or more mobile terminals. For example, the server may generate a noise-speech recognition model corresponding to the current location by applying the received noise model to a baseline speech recognition model.

In 930, the server may store the generated noise-speech recognition model.

Figure 10:
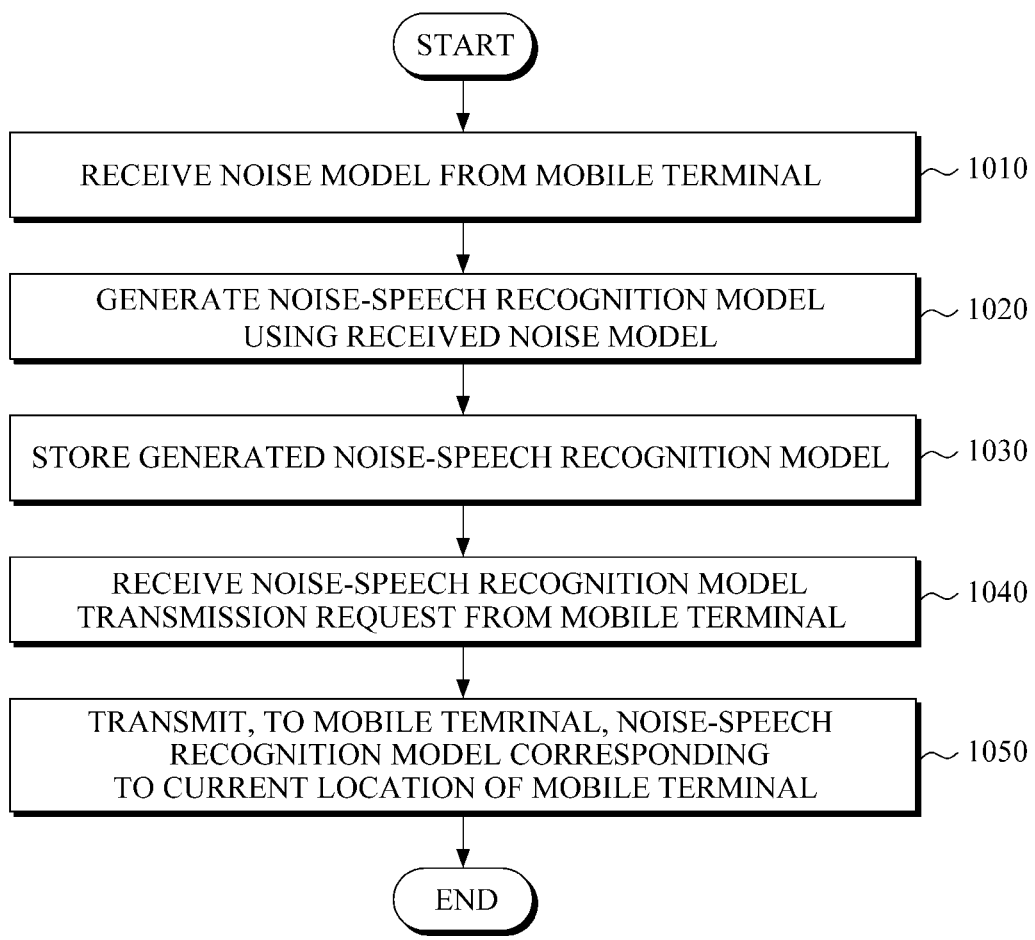
FIG. 10 is a flow chart illustrating an example of a method for generating a noise-speech recognition model.

FIG. 10 is a flow chart illustrating another example of a procedure for generating a noise-speech recognition model.

Each operation illustrated in FIG. 10 may be performed by a server including the apparatus 300 illustrated in FIG. 3.

Referring to the example illustrated in FIG. 10, a server receives noise models corresponding to the current locations of one or more mobile terminals in 1010.

In 1020, the server then generates noise-speech recognition models corresponding to the current locations of one or more mobile terminals, by using the received noise model. For example, the server may generate a noise-speech recognition model corresponding to the current location of a mobile terminal, by applying the received noise model to a baseline speech recognition model.

In 1030, the server stores the generated noise-speech recognition model.

Meanwhile, the server receives, from the mobile terminal, a noise-speech recognition model transmission request including the current location of the mobile terminal in 1040.

In 1050, the server transmits a noise-speech recognition, which corresponds to the current location included in the noise-speech recognition transmission request, to the mobile terminal that has transmitted the noise-speech recognition transmission request.

Figure 11:
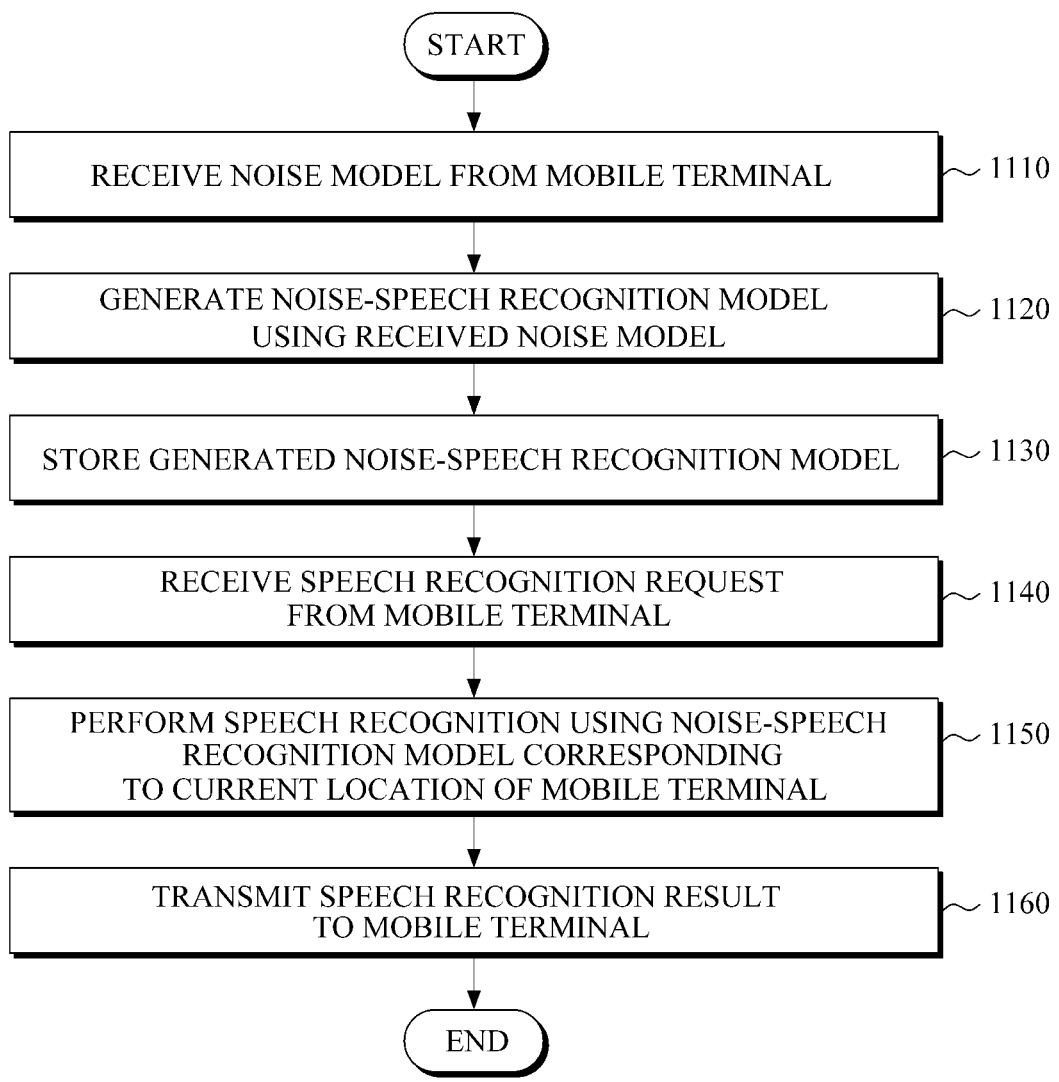
FIG. 11 is a flow chart illustrating an example of a method for generating a noise-speech recognition model.

FIG. 11 is a flow chart illustrating another example of a procedure for generating a noise-speech recognition model.

Each operation illustrated in FIG. 11 may be performed by a server including the apparatus 400 illustrated in FIG. 4.

Referring to the example illustrated in FIG. 11, a server receives, from at least one mobile terminal, a noise model corresponding to the current location of at least one mobile terminal in 1110.

In 1120, the server generates a noise-speech recognition model corresponding to the current location of at least one mobile terminal, by using the received noise model. For example, the server may generate a noise-speech recognition model corresponding to the current location of a mobile terminal, by applying the received noise model to a baseline speech recognition model.

In 1130, the server stores the generated noise-speech recognition model.

Meanwhile, in 1140, the server receives from the mobile terminal a speech recognition request including the current location of the mobile terminal and a speech signal.

In 1150, the server performs speech recognition on the speech signal, by using a noise-speech recognition model corresponding to the current location included in the speech recognition request. For example, the server may perform speech recognition by learning a speech recognition algorithm using a noise-speech recognition model corresponding to the current location included in the speech recognition request and applying the speech signal to the learned speech recognition algorithm. The speech recognition algorithm may include various speech recognition algorithms, for example, a Neural Network algorithm and HMM.

In 1160, the server transmits a result of the speech recognition to the mobile terminal that has requested the speech recognition.

The methods and/or operations described above may be recorded, stored, or fixed in one or more computer-readable memory storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

In addition, functional programs, codes and code segments for implementing embodiments may be easily inferred by programmers in the field to which the present disclosure belongs.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech recognition apparatus, comprising:
   a location determiner configured to determine a location of the apparatus;
   a noise model generator configured to generate a noise model corresponding to the location by collecting noise data related to the location;
   a noise model transmitter configured to transmit the noise model to a server, and
   a speech recognizer configured to perform speech recognition using a noise-speech recognition model that is generated by the server by applying the noise model to a baseline speech recognition model.

2. The speech recognition apparatus of claim 1, wherein the noise model generator is configured to collect the noise data that is generated at the location via a microphone of the apparatus.

3. The speech recognition apparatus of claim 1, wherein the noise model generator is configured to collect the noise data from web videos related to the location.

4. The speech recognition apparatus of claim 1, wherein the speech recognizer is further configured to transmit a speech recognition request including the location and a speech signal to the server, and receive a result of speech recognition that is performed on the speech signal using the noise-speech recognition model.

5. The speech recognition apparatus of claim 1, wherein the speech recognizer is configured to receive from the server the noise-speech recognition model applied with the noise model corresponding to the location, and to perform speech recognition using the noise-speech recognition model.

6. An apparatus for generating a noise-speech recognition model, the apparatus comprising:
   a noise model receiver configured to receive, from a mobile terminal, a noise model corresponding to a location of the mobile terminal;
   a noise-speech recognition model generator configured to generate a noise-speech recognition model corresponding to the location, by applying the noise model to a baseline speech recognition model; and
   a memory storage configured to store the noise-speech recognition model.

7. The apparatus of claim 6, further comprising:
   a speech recognizer configured to, in response to receiving a speech recognition request including information on the location of the mobile terminal and speech signal from the mobile terminal, perform speech recognition on the speech signal using the noise-speech recognition model corresponding to the location; and
   a speech recognition result transmitter configured to transmit a result of the speech recognition to the mobile terminal.

8. The apparatus of claim 6, wherein the noise model comprises noise data related to the location of the mobile terminal and information on the location of the mobile terminal.

9. The apparatus of claim 6, further comprising:
   a noise-speech recognition model transmitter configured to, in response to receiving a noise-speech recognition model transmission request including the location of the mobile terminal, transmit a noise-speech recognition model corresponding to the location to the mobile terminal.

10. A method of speech recognition, the method comprising:
    determining a location of a mobile terminal;
    collecting noise data related to the location;
    generating noise model corresponding to the location using the noise data;
    transmitting the noise model to a server,
    receiving a speech signal; and
    performing speech recognition on the speech signal using the noise-speech recognition model that is generated by the server by applying the noise model to a baseline speech recognition model.

11. The method of claim 10, wherein the performing of speech recognition comprises:
    transmitting a speech recognition request including the location of the mobile terminal and the speech signal to the server; and
    receiving a result of speech recognition performed on the speech signal using the noise-speech recognition model to which the noise model corresponding to the location of the mobile terminal at time of receipt of the speech signal is applied.

12. The method of claim 10, wherein the collecting of noise data comprises collecting noise data generated at the location.

13. The speech recognition method of claim 10, wherein the collecting of noise data comprises collecting noise data from a web video found by searching web videos related to the location.

14. The method of claim 10, wherein the performing of speech recognition comprises:
determining a location of the mobile terminal at time of receiving the speech signal; and
receiving a noise-speech recognition model to which the noise model corresponding to the location of the mobile terminal using the received noise-speech recognition model.

15. A method of generating a noise-speech model, the method comprising:
receiving a noise model corresponding to a location;
generating a noise-speech recognition model corresponding to the location by applying the noise model to a baseline speech recognition model; and
storing the noise-speech recognition model.

16. The method of claim 15, further comprising:
receiving, from a mobile terminal, a speech recognition request including the information on the location of the mobile terminal and a speech signal;
performing speech recognition on the speech signal using a noise-speech recognition model corresponding to the location of the mobile terminal; and
transmitting a result of the speech recognition to the mobile terminal.

17. The method of claim 15, further comprising:
receiving, from the mobile terminal, a noise-speech recognition model transmission request including the information on the location of the mobile terminal; and
transmitting, to the mobile terminal, a noise-speech recognition model corresponding to the location of the mobile terminal.

18. The method of claim 15, wherein the noise model comprises noise data related to the location and information on the location.

19. An apparatus, comprising:
a microphone configured to detect a speech signal; and
a processor configured to obtain a noise-speech recognition model corresponding to a location of the apparatus and to recognize a word in the speech signal using the noise-speech recognition model.

20. The apparatus of claim 19, wherein the processor is configured to determine the location of the apparatus and generate a noise model.

21. The apparatus of claim 20, wherein the apparatus further comprises a noise model transmitter configured to transmit the noise model to a server, and the processor is configured to obtain the noise-speech recognition model from the server.

22. The apparatus of claim 19, wherein the processor is configured to collect noise data at the location from a sound signal detected by the microphone.

* * * * *